United States Patent
Yi et al.

(10) Patent No.: US 12,294,082 B2
(45) Date of Patent: May 6, 2025

(54) NEGATIVE ELECTRODE AND ELECTROCHEMICAL APPARATUS CONTAINING SAME, AND ELECTRONIC APPARATUS

(71) Applicant: NINGDE AMPEREX TECHNOLOGY LIMITED, Fujian (CN)

(72) Inventors: Ting Yi, Fujian (CN); Hang Cui, Fujian (CN); Yuansen Xie, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 504 days.

(21) Appl. No.: 17/707,129

(22) Filed: Mar. 29, 2022

(65) Prior Publication Data

US 2022/0223851 A1     Jul. 14, 2022

Related U.S. Application Data

(63) Continuation of application No. PCT/CN2019/130465, filed on Dec. 31, 2019.

(30) Foreign Application Priority Data

Dec. 11, 2019   (CN) .......................... 201911267132.X

(51) Int. Cl.
   *H01M 4/38*      (2006.01)
   *H01M 4/583*     (2010.01)
   (Continued)

(52) U.S. Cl.
   CPC ........... *H01M 4/386* (2013.01); *H01M 4/583* (2013.01); *H01M 4/623* (2013.01);
   (Continued)

(58) Field of Classification Search
   CPC ...... H01M 4/386; H01M 4/583; H01M 4/623; H01M 10/0525; H01M 2004/021; H01M 2004/027
   See application file for complete search history.

(56) References Cited

U.S. PATENT DOCUMENTS

| | | | |
|---|---|---|---|
| 2007/0048615 | A1 | 3/2007 | Nagayama et al. |
| 2013/0171502 | A1 | 7/2013 | Chen et al. |

(Continued)

FOREIGN PATENT DOCUMENTS

| | | |
|---|---|---|
| CN | 101934269 A | 1/2011 |
| CN | 101944607 A | 1/2011 |

(Continued)

OTHER PUBLICATIONS

International Search Report mailed Sep. 16, 2020, corresponding to International Application No. PCT/CN2019/130465; 6 pages (with English translation).

(Continued)

*Primary Examiner* — Maria Laios
*Assistant Examiner* — Ziheng Lu
(74) *Attorney, Agent, or Firm* — Maier & Maier, PLLC

(57) ABSTRACT

A negative electrode includes a negative current collector, a first negative active material layer and a second negative active material layer. The first negative active material layer is arranged on one side of a first portion of the negative current collector, and the second negative active material layers are arranged on two sides of a second portion, different from the first portion, of the negative current collector. A ratio of a weight per unit area of the first negative active material layer to a weight per unit area of the second negative active material layer on the negative current collector is 0.47 to 0.52, and a ratio of a compacted density of the first negative active material layer to a compacted (Continued)

density of the second negative active material layer is 0.9 to 1.1.

12 Claims, 2 Drawing Sheets

(51) Int. Cl.
   *H01M 4/62* (2006.01)
   *H01M 10/0525* (2010.01)
   *H01M 4/02* (2006.01)
(52) U.S. Cl.
   CPC .. *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2014/0227562 | A1* | 8/2014 | Kamizori | H01M 50/574 |
| | | | | 429/7 |
| 2017/0033355 | A1* | 2/2017 | Kondo | H01G 11/24 |
| 2018/0316001 | A1* | 11/2018 | Kim | H01M 4/625 |
| 2019/0148762 | A1* | 5/2019 | Torita | H01M 10/0525 |
| | | | | 429/209 |
| 2019/0305317 | A1 | 10/2019 | Cheng et al. | |
| 2023/0123455 | A1* | 4/2023 | Hu | H01M 4/364 |
| | | | | 429/231.95 |

FOREIGN PATENT DOCUMENTS

| | | | |
|---|---|---|---|
| CN | 102683751 | A | 9/2012 |
| CN | 102856538 | A | 1/2013 |
| CN | 103825044 | A | 5/2014 |
| CN | 205376669 | U | 7/2016 |
| CN | 108023117 | A | 5/2018 |
| CN | 108701807 | A | 10/2018 |
| CN | 109378480 | A | 2/2019 |
| CN | 109841794 | A | 6/2019 |
| CN | 110010902 | A | 7/2019 |
| EP | 3387687 | A1 | 10/2018 |
| JP | 2012248282 | A * | 12/2012 |
| WO | 2017100415 | A1 | 6/2017 |

OTHER PUBLICATIONS

First Office Action issued Sep. 23, 2020, corresponding to Chinese Application No. 201911267132.X; 6 pages (with English Translation).

Notification to Grant Patent Right for Invention issued Apr. 1, 2021, corresponding to Chines Application No. 201911267132.X; 6 pages (with English Translation).

* cited by examiner

NEGATIVE ELECTRODE AND ELECTROCHEMICAL APPARATUS CONTAINING SAME, AND ELECTRONIC APPARATUS

CROSS-REFERENCE TO RELATED APPLICATIONS

This application is a bypass continuation application of PCT application PCT/CN2019/130465, filed on Dec. 31, 2019, which claims the benefit of priority from Chinese patent application 201911267132.X filed on Dec. 11, 2019, the disclosure of which is hereby incorporated by reference in its entirety.

TECHNICAL FIELD

This application relates to the technical field of energy storage, and in particular, to a negative electrode and an electrochemical apparatus containing the same, and an electronic apparatus.

BACKGROUND

With the rapid development of mobile electronic technologies, the frequency and experience requirements of people for using mobile electronic apparatuses such as mobile phones, tablet computers, notebook computers and unmanned aerial vehicles are increasingly high. Therefore, an electrochemical apparatus (for example, a lithium-ion battery) that provides energy for the electronic apparatuses needs to have higher energy density, larger rate, higher safety, and less capacity attenuation after repeated charge and discharge processes.

In a cycling process of the lithium-ion battery, the precipitation of lithium metal caused by the polarization of a negative electrode is one of the main reasons that impair the cycle performance of the lithium-ion battery. In view of this, the polarization of the negative electrode during the cycling of the battery needs to be reduced, and one of the feasible solutions is to further study and optimize a negative electrode structure.

SUMMARY

This application provides a negative electrode and an electrochemical apparatus including the same, and an electronic apparatus, in an attempt to solve at least one problem existing in the related art to at least some extent.

According to one aspect of this application, this application provides a negative electrode. The negative electrode includes: a negative current collector, a first negative active material layer and a second negative active material layer. The first negative active material layer is arranged on one side of a first portion of the negative current collector, and the second negative active material layers are arranged on two sides of a second portion, different from the first portion, of the negative current collector; a ratio K of a weight per unit area of the first negative active material layer to a weight per unit area of the second negative active material layer on the negative current collector is about 0.47 to 0.52, and a ratio R of a compacted density of the first negative active material layer to a compacted density of the second negative active material layer is about 0.9 to 1.1.

According to another aspect of this application, this application provides an electrochemical apparatus, including a positive electrode, a separator and the above-mentioned negative electrode.

According to yet another aspect of this application, this application provides an electronic apparatus. The electronic apparatus includes the foregoing electrochemical apparatus.

Additional aspects and advantages of the embodiments of the application are partially described and presented in the later description, or explained by implementation of the embodiments of the application.

BRIEF DESCRIPTION OF DRAWINGS

The accompanying drawings necessary to describe the embodiments of this application or the prior art will be briefly described below in order to describe the embodiments of this application conveniently. It is apparent that the drawings in the following description are only partial embodiments of this application. Those skilled in the art can still obtain, without creative work, drawings of other embodiments according to structures illustrated in these drawings.

DETAILED DESCRIPTION

Figure 1:
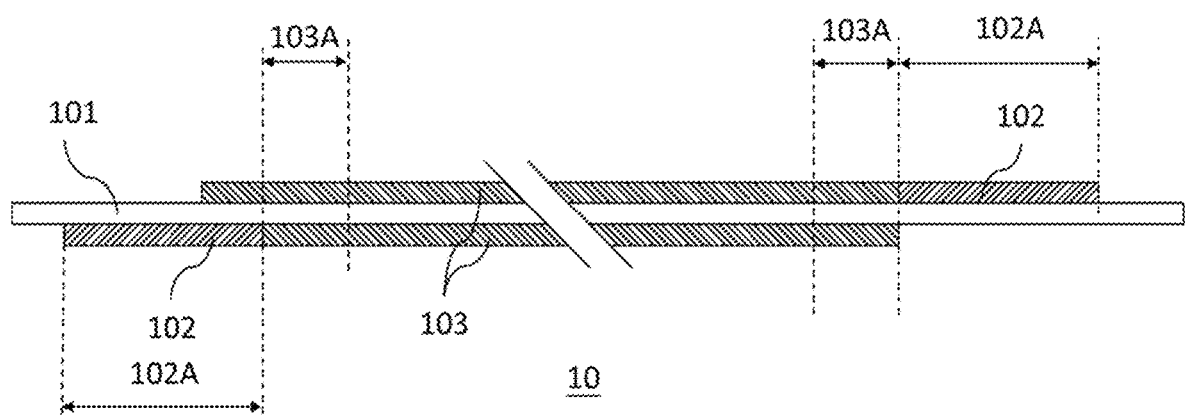
FIG. 1 is a schematic structural diagram of a negative electrode of an embodiment of this application.

Embodiments of this application will be described in detail below. Throughout the description of this application, identical or similar components, as well as components having identical or similar functions, are denoted by like reference numerals. The embodiments described herein with respect to the drawings are illustrative and diagrammatic, and are intended to provide a basic understanding of this application. The embodiments of this application shall not be construed as a limitation on this application.

As used herein, the terms "approximately", "substantially", "practically" and "about" are used to describe and illustrate small changes. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two values is less than or equal to ±10% of an average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may then be considered to be "substantially" the same.

In this specification, unless specified or limited otherwise, relative words such as: "central", "longitudinal", "lateral", "forward", "rearward", "right", "left", "inner", "outer", "lower", "higher", "horizontal", "vertical", "greater", "less", "above", "below", "top", "bottom" and derivatives thereof (for example, "horizontally", "downwardly", "upwardly") should be construed as referring to the orientation depicted in the discussion or depicted in the drawings. These relative words are used for descriptive convenience only and do not require the construction or operation of this application in a particular orientation.

In addition, quantities, ratios, and other values are sometimes presented in the format of ranges herein. It should be understood that such range formats are used for convenience and simplicity and should be flexibly understood as including not only values clearly designated as falling within the range but also all individual values or sub-ranges covered by the range as if each value and sub-range were clearly designated.

In the specific implementation modes and claims, a list of items preceded by the terms such as "at least one of", "at least one type of" or other similar terms may mean any combination of the listed items. For example, if items A and B are listed, the phrase "one of A and B" means only A; or only B; or A and B. In another example, if items A, B, and C are listed, the phrase "at least one of A, B, and C" means only A; only B; only C; A and B (excluding C), A and C (excluding B), B and C (excluding A), or all of A, B, and C. The item A may contain one element or a plurality of elements. The item B may contain one element or a plurality of elements. The item C may contain one element or a plurality of elements.

In the prior art, in order to pursue the optimal energy density and the stability and simplicity of a preparation process, a design that active materials are arranged on two sides of a middle portion of an electrode piece and an active material is arranged on one side of an end portion of the pole piece is adopted for a winding type electrode component. Referring to FIG. 1, lithium metal of a lithium-ion battery in the prior art often precipitate in a region 102A of which one side is provided with a negative active material and in a region 103A (accounting for 10% of an area of an entire negative active material layer-coated region), adjacent to the region 102A, of a region of which both sides are provided with the negative active materials due to limitations in a preparation process (the term "lithium plating" refers to precipitation of lithium metal below).

In addition, using a negative active material with a higher gram capacity is also a way to improve the energy density. Silicon has a high theoretical gram capacity (4200 mAh/g) and has a broad prospect for application in lithium-ion batteries. However, in a charge and discharge cycle process, due to poor electrical conductivity of the silicon-based material, lithium ions are easily accumulated on the surface of a negative electrode during intercalation and deintercalation to cause the lithium plating. In addition, due to the fact that the silicon-based material is high in a thermal expansion rate, when such the negative electrode design that the active materials are arranged on the two sides of the middle portion and the active material is arranged on the single side of the end portion of the negative electrode is adopted, a junction of the region of which the single side is provided with the active material and the region of which the two sides are provided with the active materials is easily deformed by heating, and then the lithium plating is intensified. The lithium plating represents the loss of lithium ions in the lithium-ion battery, causing the battery capacity loss and accelerating the cycling attenuation, so that the cycle performance of the lithium-ion battery is reduced. In addition, the lithium plating may cause excessive deintercalation of the lithium ions from a positive electrode to replenish the lost lithium ions, thereby destroying the structure of the positive electrode.

According to this application, by means of regulating and controlling the setting weights of the active material layers on the single side and the two sides and the compacted density ratio of the active material layers on the single side and the two sides in a cold pressing process, the polarization and the lithium plating are alleviated from the structure aspect of a negative electrode, and the cycle performance and the safety of the lithium-ion battery are improved.

FIG. 1 is a schematic structural diagram of a negative electrode of an embodiment of this application.

According to one aspect of this application, this application provides a negative electrode 10, including: a negative current collector 101, a first negative active material layer 102 and a second negative active material layer 103. The first negative active material layer 102 is arranged on one side of a first portion of the negative current collector 10; and the second negative active material layers 103 are arranged on two sides of a second portion, different from the first portion, of the negative current collector 10. A ratio K of a weight per unit area of the first negative active material layer 102 to a weight per unit area of the second negative active material layer 103 on the negative current collector 10 is about 0.47 to 0.52, and a ratio R of a compacted density of the first negative active material layer 102 to a compacted density of the second negative active material layer 103 is about 0.9 to 1.1.

In other embodiments, the ratio of the weight per unit area of the first negative active material layer 102 to the weight per unit area of the second negative active material layer 103 on the negative current collector 10 is about 0.5, and the ratio of the compacted density of the first negative active material layer to the compacted density of the second negative active material layer is about 0.97 to 1.0.

In a cyclic process, when the weights per unit area of the negative active material layers on the negative current collector are not consistent, a current density distributed on the active material layers with different weights per unit area is not uniform; and the non-uniform current density of the negative electrode may cause different retention conditions of lithium ions. When the current density is large, the lithium ions are more easily retained on the surface under the condition that the transmission of the lithium ions is limited, and lithium plating is caused. When the weight per unit area of the first negative active material layer 102 and the weight per unit area of the second negative active material layer 103 on the negative current collector 10 are more consistent, the current density distribution of the negative electrode can be maintained, thereby reducing the lithium plating.

As used herein, the term "compaction density" is obtained by dividing the weight of active materials per unit area on the current collector by a total thickness of the cold-pressed active material layers in a direction perpendicular to the surface of the current collector.

Figure 2:
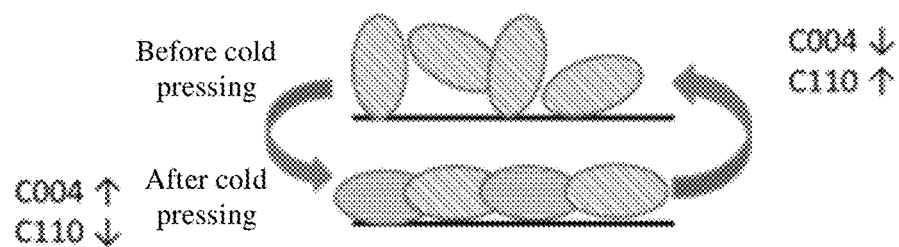
FIG. 2 is a schematic diagram of a negative active material formed by mixing a silicon-based material with graphite before and after cold pressing.

FIG. 2 is a schematic diagram of a negative active material formed by mixing a silicon-based material with graphite before and after cold pressing.

As shown in FIG. 2, an intensity C110 of a diffraction peak of a 110 crystal plane of the negative active material formed by mixing a silicon-based material with graphite before cold pressing is higher as measured by an X-ray diffraction method, which represents that a crystal structure of the negative active material before cold pressing is arranged in the 110 crystal plane. After cold pressing, an intensity C004 of a diffraction peak of a 004 crystal plane of the negative active material as measured by the X-ray diffraction method increases along with the increase of the compaction density, which represents that the arrangement of the crystal structure of the negative active material gradually tends to the 004 crystal plane along with the increase of the compaction density. When the crystal structure of the negative active material is arranged in the 004 crystal plane, the resistance against intercalation and deintercalation of the lithium ions is relatively high. Therefore, the higher the compacted density of the negative active material layer, the easier the lithium plating.

When the compaction densities of the first negative active material layer 102 and the second negative active material layer 103 are more consistent, the lithium plating in the region 102A of which the single side is provided with the negative active material and in the region 103A, adjacent to the region 102A, of the region of which the two sides are provided with the negative active materials are more uniform. Therefore, it is not easy to cause a large amount of lithium plating at any single position of the region 102A of which the single side is provided with the negative active material or the region 103A, adjacent to the region 102A, of the region of which the two sides are provided with the negative active materials, thereby reducing the lithium plating and improving the cycle performance of the electrochemical apparatus.

In some embodiments, the first negative active material layer and the second negative active material layer each independently have a compacted density of about 1.3 $g/cm^3$ to about 2.0 $g/cm^3$.

In some embodiments, the first negative active material layer and the second negative active material layer each independently include a silicon-based material and graphite. The silicon-based material is selected from a group composed of silicon oxide, silicon carbon, and a combination thereof. In some embodiments, the silicon oxide is represented by the general formula $SiO_x$, where $0.5 \leq x \leq 1.6$.

In some embodiments, a weight of the silicon-based material in the first negative active material layer and the second negative active material layer is greater than or equal to about 5% and less than about 100%, based on a total weight of the silicon-based material and the graphite. In other embodiments, the weight of the silicon-based material in the first negative active material layer and the second negative active material layer is from about 10% to about 40%. In other embodiments, the weight of the silicon-based material in the first negative active material layer and the second negative active material layer is about 15%.

The negative active material of the first negative active material layer and the second negative active material layer includes the silicon-based material and the graphite. The Dv99 of the silicon-based material is relatively small, generally less than about 20 μm, but the Dv99 of the graphite is relatively large, generally up to more than about 30 μm. A compaction thickness of an electrode piece is at least greater than a particle size of one particle, otherwise the particle would be crushed, resulting in accelerated cycling attenuation.

In some embodiments, the first negative active material layer and the second negative active material layer each independently have a single-layer thickness from about 40 μm to about 60 μm. In some embodiments, a total thickness of the second negative active material layer is from about 80 μm to about 120 μm.

In some embodiments, the first negative active material layer and the second negative active material layer each have a particle size Dv50 from about 8.0 μm to about 20 μm. In other embodiments, the first negative active material layer and the second negative active material layer each have a particle size Dv50 that is approximately, for example, about 8.0 μm, about 9.0 μm, about 10.0 μm, about 12.0 μm, about 14.0 μm, about 16.0 μm, about 18.0 μm, or about 20.0 μm, or in a range defined by any two of these values.

In some embodiments, a form of the silicon-based material includes a crystalline state, an amorphous state, or a combination thereof.

In some embodiments, the silica-based material has a particle size Dv50 of about 4.0 μm to about 10 μm. In other embodiments, the silicon-based material has a particle size Dv50 that is approximately, for example, about 4.0 μm, about 5.0 μm, about 6.0 μm, about 7.0 μm, about 8.0 μm, about 9.0 μm, or about 10.0 μm, or in a range defined by any two of these values.

In some other embodiments, the silicon-based material further includes a carbon coating layer.

In some embodiments, for the silicon-based material, a ratio of a peak height at a wavenumber of $500\ cm^{-1} \pm 10\ cm^{-1}$ to a peak height at a wavenumber of $1350\ cm^{-1} \pm 10\ cm^{-1}$ in a Raman spectrum (Jobin Yvon LabRAM HR spectrometer, wavelength: 532 nm, test range: $50\ cm^{-1}$ to $2000\ cm^{-1}$) is greater than 0. A Raman characteristic peak of the silicon is represented at a wavenumber of about $500\ cm^{-1}$, and a characteristic peak of the carbon coated the surface of the silicon is represented at a wavenumber of about $1350\ cm^{-1}$.

In some embodiments, the first negative active material layer and the second negative active material layer each independently include a binder and a conductive agent. The binder includes a material selected from a group composed of polyacrylate, polyimide, polyamide, polyamideimide, polyvinylidene fluoride, styrene-butadiene rubber, sodium alginate, polyvinyl alcohol, polytetrafluoroethylene, polyacrylonitrile, sodium carboxymethyl cellulose, potassium carboxymethyl cellulose, and a combination thereof, and the conductive agent includes a material selected from a group composed of conductive carbon black, acetylene black, Ketjen black, graphene, and a combination thereof.

It should be understood that those skilled in the art can select to add any conventional binder or conductive agent in the art according to actual needs without limitation.

In some embodiments, based on a total weight of the first negative active material layer, the total weight of the silicon-based material and the graphite in the first negative active material layer is about 94% to about 96%, a weight of the binder is about 2.8% to about 4.0%, and a weight of the conductive agent is about 0.4% to about 1.6%.

In some embodiments, based on a total weight of the second negative active material layer, the total weight of the silicon-based material and the graphite in the second negative active material layer is about 94% to about 96%, a weight of the binder is about 2.8% to about 4.0%, and a weight of the conductive agent is about 0.4% to about 1.6%.

In some embodiments, a preparation method for a negative electrode of this application includes the following steps that:

A certain amount of a silicon-based material and graphite are taken, and are mixed with a binder and a conductive agent according to a fixed weight ratio, and the mixture is mixed into deionized water for uniform stirring. After stirring, mixed slurry is obtained by screening. The mixed slurry has a viscosity from about 2500 mPa·S to about 4000 mPa·S and a solid content from about 35% to about 50%.

The mixed slurry is separately coated on a copper foil current collector. A weight per unit area of the mixed slurry coated on one side of a portion is about 65 $g/m^2$ to about 130 $g/m^2$, and a weight per unit area of the mixed slurry coated on two sides of a portion is about 130 $g/m^2$ to about 260 $g/m^2$; and the mixed slurry is dried. After drying, cold pressing treatment is performed to obtain a first negative active material layer and a second negative active material layer. A compacted density of the second negative active material layer is about 1.3 g/cm$^3$ to about 2.0 g/cm$^3$, and a ratio R of a compacted density of the first negative active material layer to the compacted density of the second negative active material layer is about 0.9 to about 1.1. Then, the negative electrode is obtained by means of a cutting procedure.

It should be understood that each step in the preparation method for the negative electrode in the embodiment of this application may be selected or substituted for other conventional processing methods in the art according to specific requirements without departing from the spirit of this application, and is not limited thereto.

According to another aspect of this application, some embodiments of this application further provide an electrochemical apparatus including the negative electrode of this application. In some embodiments, the electrochemical apparatus is a lithium-ion battery. The lithium-ion battery includes: the negative electrode in the foregoing embodiment, a separator and a positive electrode, and the separator is arranged between the positive electrode and the negative electrode.

In some embodiments, a positive current collector may be an aluminum foil or a nickel foil, and the negative current collector may be a copper foil or a nickel foil. However, other positive current collectors and negative current collectors commonly used in the art may be used without limitation.

In some embodiments, the positive electrode includes a positive material capable of absorbing and releasing lithium (Li) (sometimes referred to as "a positive material capable of absorbing/releasing lithium Li" below). The example of the positive material capable of absorbing and releasing lithium (Li) may include one or more of lithium cobalt oxide, lithium nickel cobalt manganese, lithium nickel cobalt aluminate, lithium manganese oxide, lithium manganese iron phosphate, lithium vanadium phosphate, lithium vanadyl phosphate, lithium iron phosphate, lithium titanate and lithium-rich manganese-base materials.

In the above-mentioned positive materials, the chemical formula of the lithium cobalt oxide may be $Li_yCo_aM1_bO_{2-c}$, where M1 represents at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and values of y, a, b and c are respectively within the following ranges: $0.8 \le y \le 1.2$, $0.8 \le a \le 1$, $0 \le b \le 0.2$, and $-0.1 \le c \le 0.2$;

In the above-mentioned positive electrode materials, the chemical formula of the lithium nickel cobalt manganate or lithium nickel cobalt aluminate may be $Li_zNi_dM2_eO_{2-f}$, where M2 represents at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and values of z, d, e, and f are respectively within the following ranges: $0.8 \le z \le 1.2$, $0.3 \le d \le 0.98$, $0.02 \le e \le 0.7$ and $-0.1 \le f \le 0.2$;

In the above-mentioned positive electrode materials, the chemical formula of the lithium manganese oxide is $Li_uMn_{2-g}M3_gO_{4-h}$, where M3 represents at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and values of z, g, and h are respectively within the following ranges: $0.8 \le u \le 1.2$, $0 \le g \le 1.0$ and $-0.2 \le h \le 0.2$.

In some embodiments, the positive electrode may further include at least one of a binder and a conductive agent. It should be understood that those skilled in the art can select conventional binders and conductive agents in the art according to practical requirements without limitation.

In some embodiments, the separator includes, but is not limited to, at least one of polyethylene, polypropylene, polyethylene glycol terephthalate, polyimide, and aramid. For example, the polyethylene includes at least one component of high density polyethylene, low density polyethylene and ultra-high molecular weight polyethylene. Particularly, polyethylene and polypropylene have a good effect of preventing short circuits, and can improve the stability of a battery by a turn-off effect.

The lithium-ion battery of this application further includes an electrolyte. The electrolyte may be one or more of a gel electrolyte, a solid electrolyte, and an electrolyte, and the electrolyte includes lithium salt and a non-aqueous solvent.

In some embodiments, the lithium salt is one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, $LiPF_6$ is used as the lithium salt because it provides high ionic conductivity and improves the cycle characteristics.

The non-aqueous solvent may be a carbonate compound, a carboxylate compound, an ether compound, other organic solvents, or a combination thereof.

The above carbonate compound may be a linear carbonate compound, a cyclic carbonate compound, a fluorocarbonate compound, or a combination thereof.

The examples of other organic solvents are dimethylsulfoxide, 1,2-dioxolane, sulfolane, methylsulfolane, 1,3-dimethyl-2-imidazolidinone, N-methyl-2-pyrrolidinone, formamide, dimethylformamide, acetonitrile, trimethyl phosphate, triethyl phosphate, trioctyl phosphate, phosphate ester, and a combination thereof.

In some embodiments, the non-aqueous solvent is selected from a group composed of ethylene carbonate, propylene carbonate, diethyl carbonate, dimethyl carbonate, ethyl methyl carbonate, propylene carbonate, methyl acetate, ethyl propionate, fluoroethylene carbonate, and a combination thereof.

It should be understood that the preparation methods for the negative electrode, the positive electrode, the separator and the lithium-ion battery in the embodiments of this application can select any conventional methods in the art according to specific requirements without departing from the spirit of this application. In one implementation solution of a preparation method for an electrochemical apparatus, a preparation method for the lithium-ion battery includes that: the negative electrode, the separator and the positive electrode in the above embodiments are sequentially wound, folded or stacked to form an electrode component; the electrode component is loaded into, for example, an aluminum-plastic film, and the electrolyte is injected, followed by vacuum packaging, standing, chemical conversion, shaping and other processes to obtain the lithium-ion battery.

Although illustrated above as a lithium-ion battery, those skilled in the art, after reading this application, will appreciate that the negative electrodes of this application may be used in other suitable electrochemical apparatuses. The electrochemical apparatus includes any apparatus in which an electrochemical reaction occurs. Specific examples of the apparatus include all kinds of primary batteries, secondary batteries, fuel batteries, solar batteries, or capacitors. Particularly, the electrochemical apparatus is a lithium secondary battery, including a lithium metal secondary battery, a lithium-ion secondary battery, a lithium polymer secondary battery, or a lithium-ion polymer secondary battery.

Some embodiments of this application further provide an electronic apparatus. The electronic apparatus includes the electrochemical apparatus of the embodiment of this application.

The electronic apparatus of the embodiment of this application is not particularly limited and may be any electronic apparatus known in the art. In some embodiments, the electronic apparatus may include, but is not limited to, a notebook computer, a pen-input type computer, a mobile computer, an electronic book player, a portable telephone, a portable fax machine, a portable copier, a portable printer, a headset, a video recorder, a liquid crystal television, a portable cleaner, a portable compact disc (CD) player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash light, a camera, a large household storage battery, a lithium-ion capacitor, and the like.

SPECIFIC EXAMPLES

Some specific examples and comparative examples are set forth below, and unit weight and compacted density tests are performed on the negative electrodes, and cycle performance tests and lithium plating tests are performed on the electrochemical apparatuses (lithium-ion batteries) to better explain the technical solutions of this application.

I. Test Method

Laser Particle Size Analysis:

A laser particle size test is to test a particle size distribution according to the principle that particles in different sizes can make laser produce scattering with different intensities. Main indexes for characterizing particle size characteristics of particles are Dn10, Dv10, Dv50, Dv90, Dv99 and the like. Dv50 is referred to as the particle size and represents a particle size when a volume of a sample reaches 50% of a total volume from a small particle size in a volume-based particle size distribution. The examples and the comparative examples of this application used a Mastersizer 3000 laser particle size distribution tester to analyze particle sizes of particles of samples: the sample of the negative active material was dispersed in a 100 mL dispersing agent (deionized water) to make a shading degree reach 8% to 12%. The sample was then subjected to ultrasonic treatment for 5 minutes at an ultrasonic intensity of 40 KHz and 180 W. After the ultrasonic treatment, laser particle size distribution analysis was performed on the sample to obtain particle size distribution data.

Unit Weight and Compacted Density Test:

Small round active material samples with an area of 1540.25 mm$^2$ were respectively obtained from a first negative active material layer and a second negative active material layer on a negative electrode to be tested along the surface of a negative current collector. After the negative current collector was removed, a weight of the negative active material thereof was recorded. Active material samples at 12 different positions were taken into each group, and weights per unit area of the first negative active material layer and the second negative active material layer were calculated.

A total thickness of the first negative active material layer and the second negative active material layer on the negative electrode in a direction perpendicular to the surface of the current collector was measured (a thickness of the current collector is excluded). Active material samples at 12 different positions were taken into each group, and compaction densities of the first negative active material layer and the second negative active material layer were calculated. Compaction density=Weight of negative active material/Total thickness of negative active material in a direction perpendicular to surface of current collector Cycle Performance Test The lithium-ion batteries of the following examples and comparative examples were left standing in an incubator at 25° C.±2° C. for 2 hours, charged at a constant current of 0.5 C to 4.45 V, then charged at a constant voltage of 4.45 V to 0.02 C and left standing for 15 minutes, and the batteries were discharged to 3.0 V at a constant current of 0.5 C. This was one charge and discharge cycle process, and discharge capacities of the first cycle of the lithium-ion batteries were recorded. Then, the charge and discharge cycle process was performed repeatedly according to the foregoing method, and the discharge capacities of each charge and discharge cycle process were recorded, and then were compared with the discharge capacities of the first cycle to obtain a cyclic capacity curve.

Four lithium-ion batteries in each group were taken, and an average value of capacity retention rates of the lithium-ion batteries were calculated. A cycling capacity retention rate of the lithium-ion battery=(Discharge capacity of the 400th cycle (mAh)/Discharge capacity of the first cycle (mAh))×100%.

Lithium Plating Test:

The lithium-ion batteries of the following examples and comparative examples were left standing in an incubator at 25° C.±2° C. for 2 hours and discharged to 3.00 V at a constant current of 0.5 C. After standing for 5 minutes, the lithium-ion batteries were charged to 4.45 V at a constant current of 0.7 C and then charged to 0.02 C at a constant voltage of 4.45 V. This was a lithium plating test cycle. After the above lithium plating test cycle was repeated for 10 times, the lithium-ion batteries were discharged to 3.00 V at a constant current of 0.5 C; and then the lithium-ion batteries were disassembled, and a ratio S of a lithium plating area (in gray) to an area of the negative active material layers was calculated. The degree of lithium plating was determined according to the ratio S of the lithium plating area (in gray) of the fully charged negative electrode to the area of the negative active material layers: the ratio less than 3% indicated slight lithium plating; the ratio from 3% to 5% indicated lithium plating; and the ratio greater than 5% indicated severe lithium plating.

II. Preparation Method

Preparation of Positive Electrode

Lithium cobalt oxide (LiCoO$_2$), conductive carbon black and polyvinylidene fluoride (PVDF) were dissolved in an N-methylpyrrolidone (NMP) solution in a weight ratio of 96.7:1.7:1.6 to form positive slurry. An aluminum foil was used as a positive current collector, and the positive slurry was coated on the positive current collector; and a positive electrode was obtained via drying, cold pressing and cutting procedures.

Preparation of Electrolyte

Under an environment that a moisture content is less than 10 ppm, the lithium hexafluorophosphate, the fluoroethylene carbonate (FEC) and a non-aqueous organic solvent (a weight ratio of ethylene carbonate (EC):dimethyl carbonate (DMC):diethyl carbonate (DEC) was 1:1:1) were prepared into an electrolyte in which a weight concentration of the fluoroethylene carbonate was 10 wt % and a concentration of the lithium hexafluorophosphate was 1 mol/L.

Preparation of Lithium-Ion Battery

A polyethylene (PE) porous polymer film was used as a separator. The positive electrode, the separator, and the negative electrodes of the following examples and comparative examples were sequentially stacked, so that the separator was located between the positive electrode and the negative electrode for separation, and then were wound into an electrode component. Subsequently, the electrode component was packed into an aluminum-plastic film packing bag, and was subjected to moisture removal at 80° C. to obtain a dry electrode component. Subsequently, the electrolyte was injected into the dry electrode component, and the procedures of vacuum packaging, standing, chemical conversion, shaping and the like were performed, Therefore completing the preparation of the lithium-ion batteries of the following examples and comparative examples.

Example 1

400 g of $SiO_x$ (0.5≤x≤1.6), 2400 g of artificial graphite and 35 g of conductive carbon black were added into a stirrer and stirred for 120 minutes at a revolution speed of 20 r/min Subsequently, 95 g of polyacrylic acid was added into the stirred mixture, stirred for 60 minutes at a revolution speed of 20 r/min and a rotation speed of 1200 r/min, and further stirred for 120 minutes in deionized water to obtain mixed slurry. The mixed slurry was filtered by using a 170-mesh double-layer screen to obtain negative slurry.

A copper foil was used as a negative current collector. The negative slurry was coated on the negative current collector. The weight per unit area of the negative slurry coated on one side of a portion was 76.6 $g/m^2$, and the weight per unit area of the negative slurry coated on two sides of a portion was 153.2 $g/m^2$. A coating weight ratio K of the two was 0.5, and the two were dried. After drying, cold pressing treatment was performed to obtain a first negative active material layer and a second negative active material layer. A compacted density of the second negative active material layer was 1.78 $g/cm^3$, and a ratio R of a compacted density of the first negative active material layer to the compacted density of the second negative active material layer was 0.9. Then, a negative electrode was obtained by means of a cutting procedure.

Example 2

The preparation method was the same as the preparation method of Example 1, except that the ratio R of the compacted density of the first negative active material layer to the compacted density of the second negative active material layer in Example 2 was 0.95.

Example 3

The preparation method was the same as the preparation method of Example 1, except that the ratio R of the compacted density of the first negative active material layer to the compacted density of the second negative active material layer in Example 3 was 0.97.

Example 4

The preparation method was the same as the preparation method of Example 1, except that the ratio R of the compacted density of the first negative active material layer to the compacted density of the second negative active material layer in Example 4 was 1.0.

Example 5

The preparation method was the same as the preparation method of Example 1, except that the ratio R of the compacted density of the first negative active material layer to the compacted density of the second negative active material layer in Example 5 was 1.1.

Example 6

The preparation method was the same as the preparation method of Example 1, except that the weight per unit area of the negative slurry coated on the single side of the portion in Example 6 was 76.6 $g/m^2$, and the coating weight ratio K per unit area of the two was 0.47.

Example 7

The preparation method was the same as the preparation method of Example 1, except that the weight per unit area of the negative slurry coated on the single side of the portion in Example 7 was 76.6 $g/m^2$, and the coating weight ratio K per unit area of the two was 0.52.

Example 8

The preparation method was the same as the preparation method of Example 1, except that the silicon-based material used in Example 8 was 400 g of silicon carbon (SiC).

Comparative Example 1

The preparation method was the same as the preparation method of Example 1, except that the ratio R of the compacted density of the first negative active material layer to the compacted density of the second negative active material layer in Comparative Example 1 was 0.85.

Comparative Example 2

The preparation method was the same as the preparation method of Example 1, except that the ratio R of the compacted density of the first negative active material layer to the compacted density of the second negative active material layer in Comparative Example 2 was 1.5.

Comparative Example 3

The preparation method was the same as the preparation method of Example 1, except that the weight per unit area of the negative slurry coated on the single side of the portion in Comparative Example 3 was 76.6 $g/m^2$, and the coating weight ratio K per unit area of the two was 0.4.

Comparative Example 4

The preparation method was the same as the preparation method of Example 1, except that the weight per unit area of the negative slurry coated on the single side of the portion in Comparative Example 4 was 76.6 $g/m^2$, and the coating weight ratio K per unit area of the two was 0.55.

Comparative Example 5

The preparation method was the same as the preparation method of Example 1, except that the silicon-based material used in Comparative Example 5 was 400 g of silicon carbon (SiC).

Comparative Example 6

The preparation method was the same as the preparation method of Example 1, except that the silicon-based material used in Comparative Example 6 was 400 g of silicon carbon (SiC), and the ratio R of the compacted density of the first negative active material layer to the compacted density of the second negative active material layer was 1.2.

Unit weight and compacted density tests were performed on the negative electrodes of the above examples and comparative examples. Subsequently, a cycle performance test and a storage expansion rate test were performed on the lithium-ion batteries, and their test results were recorded.

The statistical values of the negative electrodes of Examples 1-8 and Comparative Examples 1-6 and the results that pass through the unit weight and compacted density tests, the cycle performance test and the lithium plating test were shown in Table 1 below.

first negative active material layer and the second negative active material layer is the same; and at this time, R value<1 indicates that the compacted density of the first negative active material layer region is smaller, and lithium ions are more easily intercalated and deintercalated in the first negative active material layer region, so that no lithium plating occurs in the first negative active material layer region. R>1 indicates that the compacted density of the first negative active material layer region is larger, so that lithium ions have higher deintercalation resistance, and lithium plating is easier to occur in the first negative active material layer region.

Figure 3:
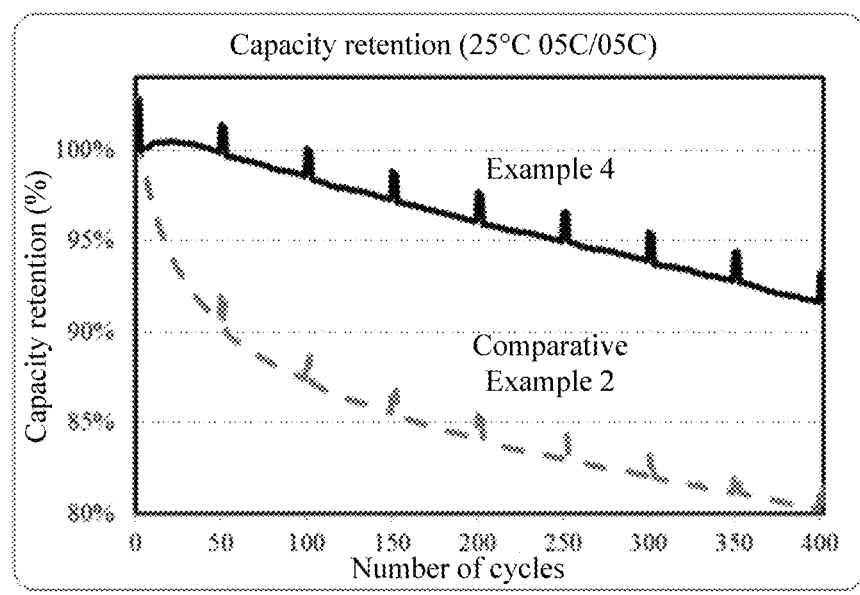
FIG. 3 is a curve of cycle capacities of Example 4 and Comparative Example 2 of this application.

FIG. 3 is a curve of cycling capacities of Example 4 and Comparative Example 2 of this application.

As shown in FIG. 3, the ratio R of the compacted density of the first negative active material layer of the fresh negative electrode in Example 4 to the compacted density of second negative active material layer was 1. After 400 cycles, expansive deformation was not easy to occur due to the consistent compaction density, and the R value did not change much. Therefore, the lithium-ion battery of Example 4 can maintain an extremely high capacity retention rate throughout the cycle. In contrast, the ratio R of the compaction densities of the negative electrode of Comparative

TABLE 1

| Example/Comparative Example | Silicon-based material | K value of fresh negative electrode | R value of fresh negative electrode | Capacity retention rate in cycling (—) | K value after 400 cycles | R value after 400 cycles | S value of the region (102A) of the first negative active material layer after 400 cycles | S value of the region (103A), adjacent to the first negative active material layer, of the second negative active material layer after 400 cycles | S value after lithium plating test cycles |
|---|---|---|---|---|---|---|---|---|---|
| Example 1 | Silicon oxide | 0.5 | 0.9 | 90.3% | 0.5 | 0.88 | 0 | 2.8% | 2.6% |
| Example 2 | Silicon oxide | 0.5 | 0.95 | 91.1% | 0.5 | 0.94 | 0 | 1.6% | 2.0% |
| Example 3 | Silicon oxide | 0.5 | 0.97 | 91.7% | 0.5 | 0.96 | 0 | 0 | 0 |
| Example 4 | Silicon oxide | 0.5 | 1.0 | 92.1% | 0.5 | 1.0 | 0 | 0 | 0 |
| Example 5 | Silicon oxide | 0.5 | 1.1 | 91.9% | 0.5 | 1.12 | 2.4% | 0 | 2.5% |
| Example 6 | Silicon oxide | 0.47 | 1.0 | 89.7% | 0.47 | 0.95 | 2.7% | 0 | 2.8% |
| Example 7 | Silicon oxide | 0.52 | 1.0 | 90.6% | 0.52 | 1.08 | 0 | 1.8% | 2.0% |
| Example 8 | Silicon carbon | 0.5 | 1.0 | 89% | 0.5 | 1.0 | 0 | 0 | 0 |
| Comparative Example 1 | Silicon oxide | 0.5 | 0.85 | 83.4% | 0.5 | 0.78 | 2.0% | 3.3% | 20% |
| Comparative Example 2 | Silicon oxide | 0.5 | 1.5 | 80.3% | 0.5 | 1.6 | 6% | 4.5% | 22% |
| Comparative Example 3 | Silicon oxide | 0.4 | 1.0 | 77.5% | 0.4 | 0.83 | 8% | 2.5% | 30% |
| Comparative Example 4 | Silicon oxide | 0.55 | 1.0 | 82.5% | 0.55 | 1.1 | 2.6% | 8.9% | 26% |
| Comparative Example 5 | Silicon carbon | 0.5 | 0.85 | 73.1% | 0.5 | 0.72 | 2.7% | 4.3% | 28% |
| Comparative Example 6 | Silicon carbon | 0.5 | 1.2 | 79% | 0.5 | 1.4 | 3.4% | 3.1% | 24% |

As shown in table 1, compared with the corresponding comparative examples, the examples of this application can effectively reduce lithium plating on the negative electrode and improve the cycling capacity retention rate of the lithium-ion battery.

As can be seen by comparing Examples 1-5 and 8 with Comparative Examples 1, 2, 5 and 6, when the ratio R of the compacted density of the first negative active material layer to the compacted density of the second negative active material layer is closer to 1, the lithium plating of the negative electrode can be reduced more. When the ratio K of the weight per unit area of the first negative active material layer to the weight per unit area of the second negative active material layer is 0.5, since the coating weight of the electrode piece is uniform, the current density between the Example 2 was 1.5; after 400 cycles, the originally inconsistent compaction densities caused different contents of the silicon-based materials of the first negative active material and the second negative active material on the negative electrode, Therefore resulting in inconsistent expansion rates and intensified changes of the compaction densities. Therefore, the capacity retention rate of the lithium-ion battery of Comparative Example 2 would be sharply decreased.

As can be seen by comparing Examples 4, 6, and 7 with Comparative Examples 3 and 4, when the ratio K of the weight per unit area of the first negative active material layer to the weight per unit area of the second negative active material layer is closer to 0.5, the lithium plating of the negative electrode can be reduced more. K<0.5 indicates that the first negative active material layer region contains fewer negative active materials, resulting in a large current density of the first negative active material layer region in the cycle process, so that lithium plating is easy to occur. K>0.5 indicates that the first negative active material layer region contains more negative active materials, resulting in a small current density of the first negative active material layer region in the cycle process, so that lithium plating is hard to occur.

By means of comparison of the above-mentioned examples and comparative examples, it can be clearly understood that by controlling the ratio K of the weights per unit area and the ratio R of the compaction densities of the first negative active material layer to the second negative active material layer, the negative electrode of this application can effectively reduce the degree of lithium plating, thereby improving the cycle performance of the lithium-ion battery.

References to "some embodiments", "partial embodiments", "an embodiment", "another example", "for example", "specific examples", or "partial examples" in the whole specification mean the inclusion of specific features, structures, materials, or characteristics described in the embodiment or example in at least one embodiment or example of this application. Accordingly, descriptions appearing in the whole specification, such as "in some embodiments", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. A negative electrode, comprising:
   a negative current collector;
   a first negative active material layer, wherein the first negative active material layer is arranged on one side of a first portion of the negative current collector; and
   a second negative active material layer, wherein the second negative active material layer is arranged on two sides of a second portion of the negative current collector, wherein the second portion of the negative current collector is different from the first portion of the negative current collector;
   wherein a ratio of a weight per unit area of the first negative active material layer to a weight per unit area of the second negative active material layer on the negative current collector is 0.47 to 0.52, and a ratio of a compacted density of the first negative active material layer to a compacted density of the second negative active material layer is 0.9 to 1.1;
   wherein a thickness of the first negative active material layer is 40 μm to 60 μm, and a thickness of the second negative active material layer on each of the two sides of the second portion is 40 μm to 60 μm.

2. The negative electrode according to claim 1, the weight per unit area of the first negative active material layer on the first portion is 65 g/m² to 130 g/m², and the weight per unit area of the second negative active material layer on the second portion is 130 g/m² to 260 g/m².

3. The negative electrode according to claim 1, wherein the first negative active material layer and the second negative active material layer each independently comprise a silicon-based material and graphite, wherein the silicon-based material is selected from the group consisting of silicon oxide, silicon carbon, and a combination thereof.

4. The negative electrode according to claim 3, wherein a weight of the silicon-based material in the first negative active material layer and the second negative active material layer is greater than or equal to 5% and less than 100%, based on a total weight of the silicon-based material and the graphite.

5. The negative electrode according to claim 3, wherein a form of the silicon-based material comprises a crystalline state, an amorphous state, or a combination thereof, wherein the first negative active material layer has a particle size Dv50 of 8.0 μm to 20 μm, and the second negative active material layer has a particle size Dv50 of 8.0 μm to 20 μm.

6. The negative electrode according to claim 3, wherein for the silicon-based material, a ratio of a peak height at a wavenumber of 500 cm$^{-1}$±–10 cm$^{-1}$ to a peak height at a wavenumber of 1350 cm$^{-1}$±10 cm$^{-1}$ in a Raman spectrum is greater than 0.

7. The negative electrode according to claim 3, wherein the silicon-based material further comprises a carbon coating layer.

8. The negative electrode according to claim 3, wherein the first negative active material layer and the second negative active material layer each independently comprise a binder and a conductive agent; wherein the binder comprises a material selected from the group consisting of polyacrylate, polyimide, polyamide, polyamideimide, polyvinylidene fluoride, styrene-butadiene rubber, sodium alginate, polyvinyl alcohol, polytetrafluoroethylene, polyacrylonitrile, sodium carboxymethyl cellulose, potassium carboxymethyl cellulose, and a combination thereof; and the conductive agent comprises a material selected from the group consisting of conductive carbon black, acetylene black, Ketjen black, graphene, and a combination thereof.

9. The negative electrode according to claim 8, wherein based on a total weight of the first negative active material layer, the total weight of the silicon-based material and the graphite in the first negative active material layer is 94% to 96%, a weight of the binder is 2.8% to 5.0%, and a weight of the conductive agent is 0.4% to 1.6%; and
   based on a total weight of the second negative active material layer, the total weight of the silicon-based material and the graphite in the second negative active material layer is 94% to 96%, the weight of the binder is 2.8% to 4.0%, and the weight of the conductive agent is 0.4% to 1.6%.

10. An electrochemical apparatus, comprising:
    a positive electrode;
    a separator; and
    a negative electrode;
    wherein the negative electrode comprises a negative current collector; a first negative active material layer, wherein the first negative active material layer is arranged on one side of a first portion of the negative current collector; and a second negative active material layer, wherein the second negative active material layers are arranged on two sides of a second portion of the negative current collector, wherein the second portion of the negative current collector is different from the first portion of the negative current collector,
    wherein a ratio of a weight per unit area of the first negative active material layer to a weight per unit area of the second negative active material layer on the negative current collector is 0.47 to 0.52, and a ratio of a compacted density of the first negative active material layer to a compacted density of the second negative active material layer is 0.9 to 1.1;

wherein a thickness of the first negative active material layer is 40 μm to 60 μm, and a thickness of the second negative active material layer on each of the two sides of the second portion is 40 μm to 60 μm.

11. An electronic apparatus, comprising the electrochemical apparatus according to claim 10.

12. The electrochemical apparatus according to claim 10, the weight per unit area of the first negative active material layer on the first portion is 65 $g/m^2$ to 130 $g/m^2$, and the weight per unit area of the second negative active material layer on the second portion is 130 $g/m^2$ to 260 $g/m^2$.

* * * * *